US011507686B2

United States Patent
Chugunov

(10) Patent No.: US 11,507,686 B2
(45) Date of Patent: *Nov. 22, 2022

(54) SYSTEM AND METHOD FOR ENCRYPTING ELECTRONIC DOCUMENTS CONTAINING CONFIDENTIAL INFORMATION

(71) Applicant: Crosstech Solutions Group LLC, Moscow (RU)

(72) Inventor: Yevgeniy I Chugunov, Moscow (RU)

(73) Assignee: CROSSTECH SOLUTIONS GROUP LLC, Moscow (RU)

( * ) Notice: Subject to any disclaimer, the term of this patent is extended or adjusted under 35 U.S.C. 154(b) by 0 days.

This patent is subject to a terminal disclaimer.

(21) Appl. No.: 17/688,160

(22) Filed: Mar. 7, 2022

(65) Prior Publication Data

US 2022/0188449 A1 Jun. 16, 2022

Related U.S. Application Data

(63) Continuation-in-part of application No. 17/237,124, filed on Apr. 22, 2021, now Pat. No. 11,295,027.

(30) Foreign Application Priority Data

Sep. 1, 2020 (RU) .............................. 2020128916

(51) Int. Cl.
*G06F 21/62* (2013.01)
*G06F 21/60* (2013.01)
(Continued)

(52) U.S. Cl.
CPC ........ *G06F 21/6227* (2013.01); *G06F 21/602* (2013.01); *H04L 9/0631* (2013.01);
(Continued)

(58) Field of Classification Search
CPC . G06F 21/6227; G06F 21/602; H04L 9/0631; H04L 9/321; H04L 9/3247; H04L 9/3263
(Continued)

(56) References Cited

U.S. PATENT DOCUMENTS 6,345,288 B1 * 2/2002 Reed .................. H04L 67/28
709/200
7,743,248 B2 * 6/2010 Bisbee .................. G06Q 20/02
726/10

(Continued)

OTHER PUBLICATIONS

Seol et al., 2018 IEEE Access, "Privacy-Preserving Attribute-Based Access Control Model for XML-Based Electronic Health Record System", pp. 9114-9128 (Year: 2018).*
(Continued)

*Primary Examiner* — Khalil Naghdali
(74) *Attorney, Agent, or Firm* — ArentFox Schiff LLP; Michael Fainberg

(57) ABSTRACT

A method for protecting documents includes assigning electronic marks to a document. The electronic marks include a symmetric encryption key and a symmetric encryption algorithm. Access activity with respect to the document is monitored continuously and in real-time. In response to receiving a request from a user to access the document, validity of a digital certificate of the user is checked. Access to the document is denied and a notification is sent to a server indicating an attempted unauthorized access to the document, in response to determining that the digital certificate of the user is not valid. Attributes of the electronic marks are analyzed, in response to that the digital certificate of the user is valid. The document is automatically decrypted, if an attribute of encryption is indicated in the electronic marks, based on the symmetric encryption key and the symmetric encryption algorithm is included in the electronic marks.

20 Claims, 10 Drawing Sheets

(51) Int. Cl.
  *H04L 9/06*    (2006.01)
  *H04L 9/32*    (2006.01)
(52) U.S. Cl.
  CPC ............ *H04L 9/321* (2013.01); *H04L 9/3247* (2013.01); *H04L 9/3263* (2013.01)
(58) Field of Classification Search
  USPC ......................................................... 726/30
  See application file for complete search history.

(56) References Cited

U.S. PATENT DOCUMENTS

| | | | |
|---|---|---|---|
| 8,244,745 B2 * | 8/2012 | Lim | H04L 67/303 |
| | | | 707/758 |
| 9,141,823 B2 * | 9/2015 | Dawson | H04L 9/00 |
| 2009/0164781 A1 * | 6/2009 | Bouchard | H04L 63/0428 |
| | | | 713/165 |
| 2015/0310188 A1 * | 10/2015 | Ford | G06F 21/10 |
| | | | 726/28 |

OTHER PUBLICATIONS

Slosarek et al., arXiv:2001,01477v2 [cs.SE] Feb. 20, 2020, "Using CEF Digital Service Infrastructures in the Smart4Health Project for the Exchange of Electronic Health Records", pp. 1-25 (Year: 2020).*

* cited by examiner

SYSTEM AND METHOD FOR ENCRYPTING ELECTRONIC DOCUMENTS CONTAINING CONFIDENTIAL INFORMATION

CROSS-REFERENCE TO RELATED APPLICATION

The present application is a continuation-in-part of U.S. patent application Ser. No. 17/237,124 filed Apr. 22, 2021 and titled SYSTEM AND METHOD FOR PROTECTING ELECTRONIC DOCUMENTS CONTAINING CONFIDENTIAL INFORMATION FROM UNAUTHORIZED ACCESS and claims benefit of priority under 35 U.S.C. 119(a)-(d) to a Russian Patent Application 2020128916 filed on Sep. 1, 2020, both of which are incorporated by reference herein.

FIELD OF TECHNOLOGY

The present technical solution relates to the field of computer technology, and in particular to systems for protecting electronic documents containing confidential information from unsanctioned access.

BACKGROUND

The problem of preventing unauthorized third parties from accessing confidential and sensitive information is becoming increasingly pressing in today's world. As a result of the universal distribution of electronic communication systems capable of receiving, storing and processing information, significant financial, human and time resources are required to provide protection against information leaks. In some cases, such protection is becoming increasingly difficult, or virtually impossible particularly when the information obtained from hardware and software security systems is insufficient and/or fragmentary.

Almost all known technical solutions resolve the problem of protecting information by placing confidentiality marks on documents. However, such prior art solutions are not concerned with either the protection of documents from subsequent distribution or the possibility of identifying an employee who has permitted the unauthorized dissemination of confidential information.

SUMMARY

Disclosed are systems and methods for protecting electronic documents containing confidential information.

Advantageously, the disclosed aspects prevent leaks of confidential information from information systems while also preventing the distribution of stolen information by the interaction of modules that limit access to files, while also making it possible to identify a user who has permitted the unsanctioned dissemination of confidential information.

The object of one or more aspects of the present disclosure is a method for protecting electronic documents containing confidential information. One or more electronic marks are assigned to a document. The one or more electronic marks includes a symmetric encryption key and a symmetric encryption algorithm. Access activity with respect to the document is monitored continuously and in real-time. In response to receiving a request from a user to access the document, validity of a digital certificate of the user is checked and permissions to access the document are checked by analyzing metadata of the document and by analyzing one or more access rules. The metadata includes the one or more electronic marks. The one or more access rules links a list of permitted electronic marks to one or more users. Access to the document is denied and a notification is sent to a server indicating an attempted unauthorized access to the document, in response to determining that the one or more electronic marks are not included in the list of permitted electronic marks for the user requesting the access to the document or in response to determining that the digital certificate of the user is not valid. Attributes of the one or more electronic marks are analyzed, in response to determining that the one or more electronic marks are included in the list of permitted electronic marks and in response to determining that the digital certificate of the user is valid. The document is automatically decrypted, if an attribute of encryption is indicated in the one or more electronic marks, based on the symmetric encryption key and the symmetric encryption algorithm is included in the one or more electronic marks.

In one aspect, the digital certificate includes a public key of the user, as issued by a Certificate Authority (CA).

In one aspect, the method further includes receiving the symmetric encryption key from a server, prior to assigning one or more electronic marks to a document.

In one aspect, the symmetric encryption key is encrypted using the public key of the user.

In one aspect, the symmetric key encryption algorithm comprises AES-256 encryption algorithm.

In one aspect, the method further includes automatically assigning a new electronic mark to the document when the document is moved from one folder to another.

In one aspect, the one or more electronic marks are assigned using a classifier.

In one aspect, the classifier determines a suitable mark based on content of specified combinations of words or data in a text of the document.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
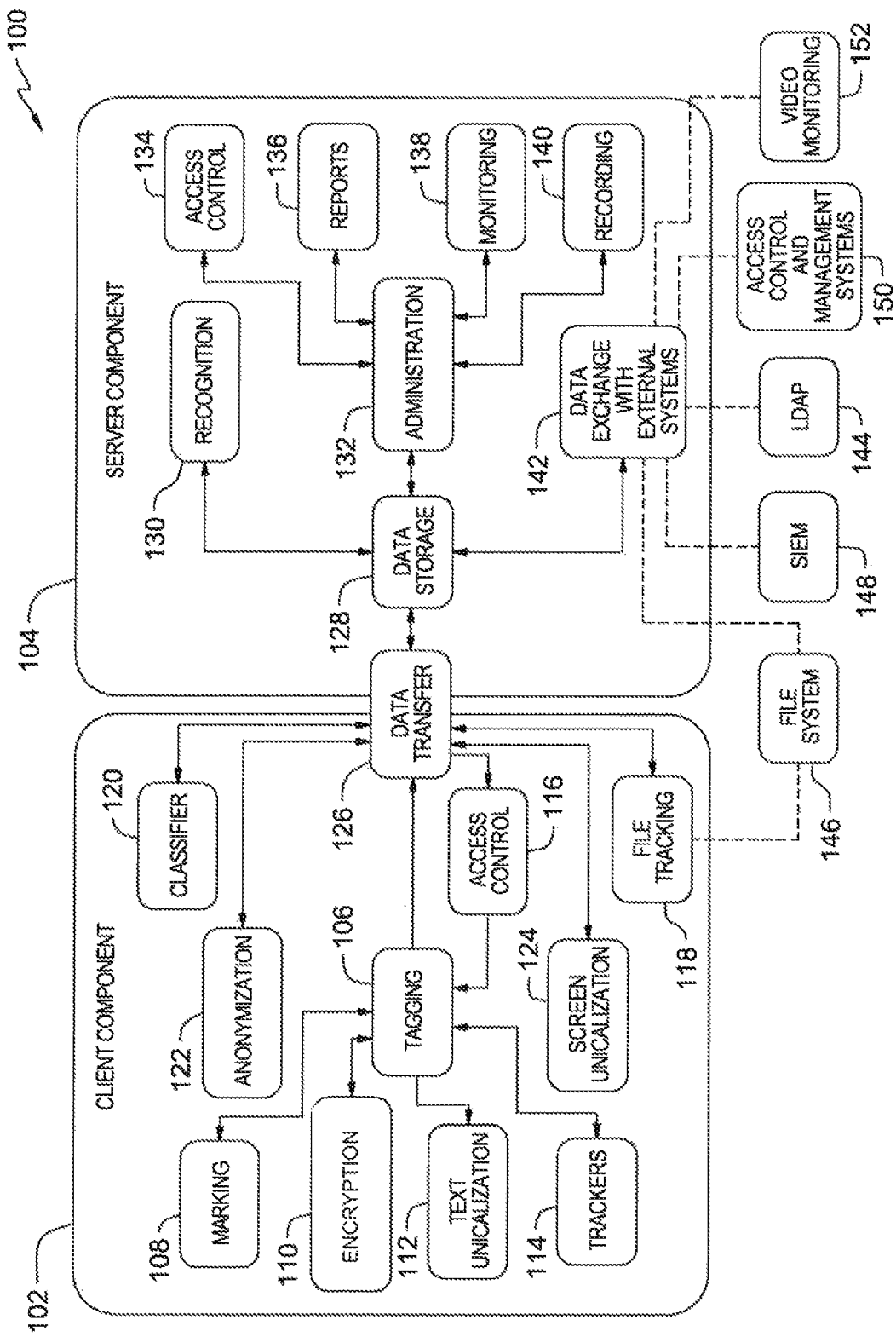
FIG. 1 shows a model of the functional modules of the system.

Exemplary aspects are described herein in the context of a system, method, and computer program product for stenographic text encoding. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items FIG. 1 shows a model of the functional modules of the system.

The functional modules shown in the client component 102 of the information management system 100 enable users (e.g., company's employees) to work with documents according to their level of access to confidential/sensitive information in the organization. Means and methods of securing protected system files in a data processing system are disclosed, wherein the interaction of the functional modules makes it possible to correctly control the rights of access to documents, to create special hidden or visible marks on the documents that users work with, and to transfer information on the actions of all users with documents to a single information store. The substance of a "mark" may have either a visible or an electronic (hidden) representation. The visible part may take the form of an object (text or image) placed in a document (above, below or behind the text). The hidden part may take the form of supplementary data recorded in the document file (in the metadata, for example). The individual form of a mark is determined by the administration module 132 described below. The visible mark to be contained (if necessary) and its location in the document for each type of document (text, electronic table, presentation, diagram, etc.) may be specified by the administration module 132.

The functional modules shown in the server component 104 of the information management system 100 enables the administrators, system administrators, and security officers to secure the information to ensure confidentiality, and to ensure compliance with the data security policy in the organization. The interaction of these functional modules makes it possible to configure a platform with external services, to control users' access levels, to set the necessary parameters for supplementary protection of information from leaks outside the organization, to monitor all actions of users with documents, to establish recording, and to investigate incidents successfully.

Below the functional modules (subsystems) of the information management system 100 are described.

The tagging module 106 may be configured to place electronic tags of the organization or electronic information about a document (digital marks) on files, and may include marking 108, encryption 110, text unicalization 112 and tracker 114 modules. The marking module 108 may be configured to assign visible marks to documents. The marking process can also be automated by default: the marking module 108 may perform assignment of one mark to all documents for their recording, with possible manual modification of the mark subsequently. The assigned visible mark and a list of accessible/prohibited marks may be used by the information management system 100 to determine accessibility of the document for other users of the system. A visible digital mark may take the form of a text, an image or a bar code. The encryption module 110 may be configured to package the file in an encrypted container, which may be encrypted using a plurality of different encryption algorithms, when work with the file is finished. For example, the content of the document in encrypted form may be packaged into the encrypted container. Such a file cannot be accessed without a specified code, even outside the organization. The encryption module 110 may be configured to provide centralized protection against unauthorized access to data. In an aspect, the encryption algorithm (e.g., AES-256 encryption algorithm) may be assigned on the server in the settings of one or more digital marks. Depending on the chosen encryption algorithm, encryption takes place using a key or a digital certificate. A digital certificate may include a public key of the user. A digital certificate is essentially a certification (issued by a trusted third party known as a certificate authority or CA) that a particular public key is associated with an identity specified in the certificate (e.g., a web address of a server or other computer resource). That is, the CA validates the association between the owning entity and the public key. Encrypted documents may be available only to users who have an access to the document associated with the digital mark having a valid digital certificate and such access may only be available within an organization. The text unicalization module 112 may be configured to perform hidden encoding of information into the text of a document with which users are working. The term "hidden encoding" as used herein refers to placing of supplementary information, imperceptible to the user, among the perceptible. The following information may be encoded using the hidden encoding: user identifier, document identifier, the machine on which the document was edited and the time of editing. The encoded information may be retained if a screenshot is taken or if the text document with said feature is output, thus enabling the incident to be successfully investigated. The tracker module 114 may be configured to place special marks, which may send a signal to the organization if a file bearing this tracker is opened outside of the organization. In an aspect, the special mark may include a link to an external resource that generates a report on opening may be embedded in the metadata or in the content of the document.

The access control module 116 may be configured to provide access to tagged documents and/or limit the actions of users with tagged documents based on rules. Information on accessible or prohibited digital marks for users may be sent from the server component 104. In the server component 104, data security officers may establish rules in which digital marks are assigned to each group of users and the possible permitted actions with protected documents may be selected. It may be possible for the information management system 100 to limit all work with active documents bearing the mark "X", or to permit one or more actions (such as, but not limited to examining/editing/printing/modifying a mark/retaining a document, or creating a new document based on the current document).

The file tracking module 118 may be configured to track and automatically notify the server component 104 of, all actions performed by users with protected documents. The fact that a file has been opened may be communicated to the server component 104 with a mark. The fact that a document has been opened may be communicated by email with an embedded tracker. The fact and conditions of a leak of a document with encoded information may be determined when copies of this document are detected. In an aspect, the file tracking module 118 may separate into a special category any cases detected during tracking in which attempts are made to obtain access to prohibited documents, and may automatically notify the server component 104 of such events as a priority.

The classification module (classifier) 120 may be configured to determine a required mark for the protected document automatically from the context. The classification module 120 may also be configured to monitor the state of folders and/or directories and mark documents according to the configuration of a folder. In an aspect, the classification module 120 may be responsible for correctly tagging all files with the organization's digital mark, which may enable all the files in the organization to be fully monitored.

The anonymization module 122 may be configured to remove personal information from the properties of a file and/or data objects, to process and eliminate external artefacts in images, and to provide a file with a state of total anonymization. This module may be at least a part of a special category of possibilities for users, since it may be a decision of an "anti-" system and may be requested by a trusted group of users only.

The screen unicalization module 124 may be responsible for embedding a unique identifier during the user's active work session with an automated workplace. In an aspect, a special mark may be placed on top of the image on the screen, giving the image unique features. The screen unicalization module 124 may help identify a user in case of a leak of confidential information, when the information may have been photographed from the screen or by retaining information displayed on a screen (screenshot). Any document output on the screen contains encoded data. Any photographed document will therefore contain the encoded data.

The data transfer module 126 may be configured to establish respective communication sessions between the client component 102 and the server component 104. Updated policy/configurations for each user may be received by the client component 102. Event information about events completed by the aforesaid user may be transferred to the server component 104. In an aspect, the data transfer module 126 may also be configured to provide full-featured operation of the client component 102 if it may temporarily lose network connection with the server component 104, and only the digital marks that were transferred from the server component 104 in the last connection may be accessible to the user. In turn, the list of events taking place at the moment of disconnection may be accumulated in the data transfer module 126 and may be transferred to the server component 104 when the connection with the client component 102 is reestablished, in accordance with their priority.

The data storage module 128 may be configured to provide powerful processing and storage of data provided by the client component 102, by a web interface, and by external services.

The recognition module 130 may be configured to enable incident management and investigation. In an aspect, the recognition module 130 may also be configured to process documents and images detected outside of the organization, containing artefacts of a unicalized screen or of text unicalization, and of a bar code. A leaked document may be detected in open sources. The investigation of the incident makes it possible to determine who permitted the leak and when. The list of users matching the encoded information may be determined automatically. If the representation quality is inadequate for precise detection, the users who provide the best match are determined. The resulting list of users may be processed, for example, by the data security officer 202.

The administration module 132 may be configured to control processes within a platform. Administration module 132 may include the access control 134, report configuration 136, monitoring 138 and recording 140 modules. The access control module 134 may be used to configure groups of users, to synchronize outputs from the Lightweight Directory Access Protocol ("LDAP"), to control group access to documents on the basis of sets of rules. The access control module 134 may be further used to configure sets of rules, tags, and marks and their properties, to configure classifier parameters, and to add or configure web users. The report configuration module 136 may be used to create and configure push dispatches and email reports, and to control the dispatch of reports. The monitoring module 138 may be configured to provide systematized data on the results of the work of the system 100 and the users. The monitoring module 138 may be configured to record and monitors the actions of users and all events with documents, may be configured to compose a list of all electronic documents, and to systematize their development and amendment. The recording module 140 may be used to construct charts, create a physical document tree, and output data from logs into a customer's template. In other words, the recording module 140 may represent data about the use of documents and actions performed with them. Such data may be represented in different cross section The module for exchanging data with external systems 142 may be used to perform the configuration of a platform, providing connection to external services in the form of an LDAP 144, file system 146, Security Information Event Manager ("SIEM") 148, access control and management system 150, and internal video surveillance modules 152, and to perform the centralized configuration of the client component 102 of an application at users' automated workplaces. Within said module, the implementation of license conditions for the use of software may be tracked, and centralized connection and disconnection of the client software may take place.

Figure 2:
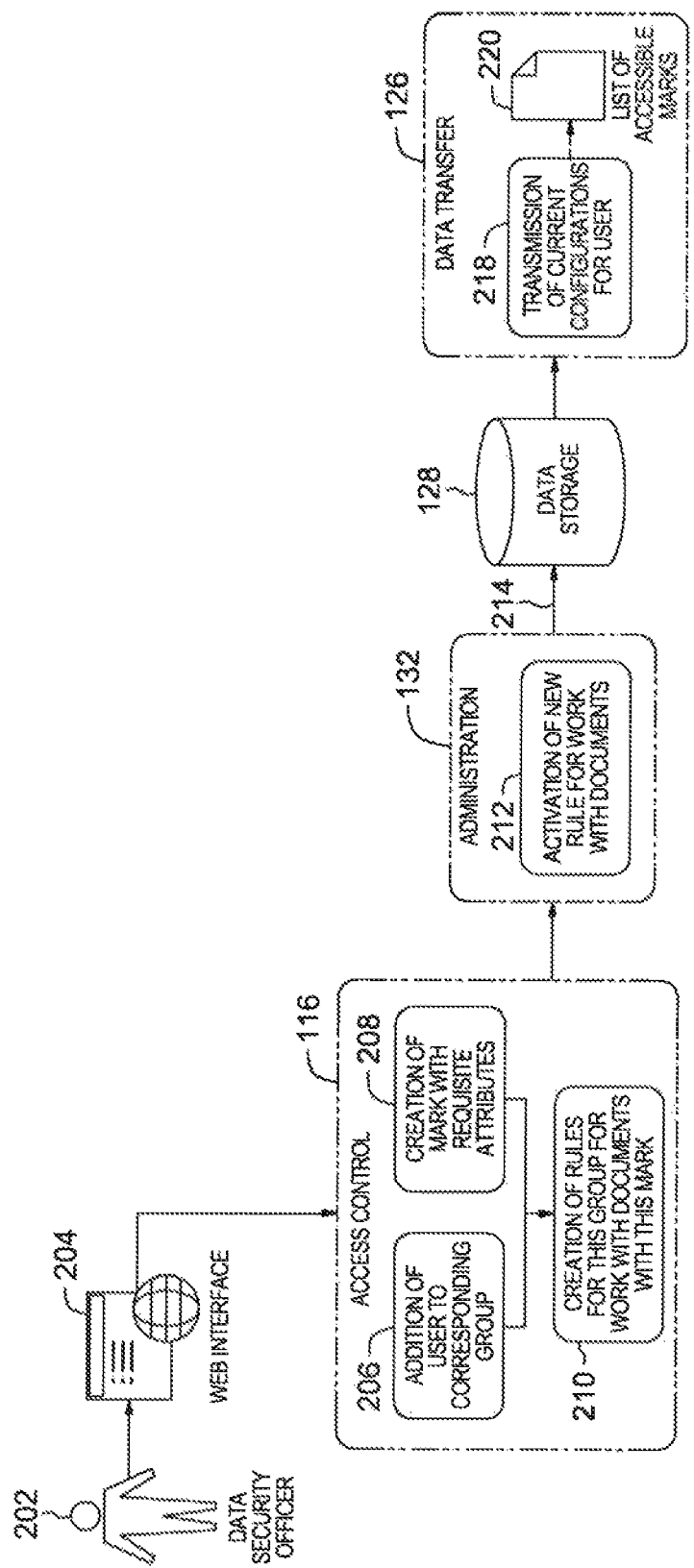
FIG. 2 is a flowchart showing the procedure for controlling the access to confidential information.

FIG. 2 is a flowchart showing the procedure for controlling the access to confidential information. New composition of groups, as well as new marks and new rules can be added by a data security officer 202 using a web interface 204. In an aspect, at 206, the access control module 116 may add a user to a corresponding group. Confidentiality of information may be achieved via a plurality of access rules. The access rules may be created either for a group of users or individually. The access control module 116 may support both variants of the configuration. The access rules may be updated dynamically (in real time). At 208, the access control module 116 may create a digital mark with the required attributes for a corresponding document. In an aspect, the access rules may be used to create a permitting or prohibiting link between a group of users and a list of marks. At 210, the access control module 116 may create an access rule for the group of users used in step 206 who have an access to the document associated with the digital mark created at 208. To enable a rule to come into force, it should be activated. As shown in FIG. 2, at 212, the administration module 132 may activate the access rule created in step 210 to work with corresponding documents. The new data may be stored in the data storage 128 (step 214). During the transfer of information from the server 104 to the client component 102 from the data storage 128, such as user's current configurations (step 218), a list of accessible marks and their attributes may be created for each user (step 220). The information may be transferred to the client component 102 and may be stored until required, or until a user attempts to open a document.

In an aspect, the access control module 116 may be configured to constantly automatically embed a unique number for the entire working session with a corresponding document. Constant encoding of information presented on the computer screen may be activated in the procedure for configuring the rules. Information about procedures established for groups of users may be kept in the data storage module 128 and may be sent via the data transfer module 126 to the client component 102, where it may be automatically activated.

Figure 3A:
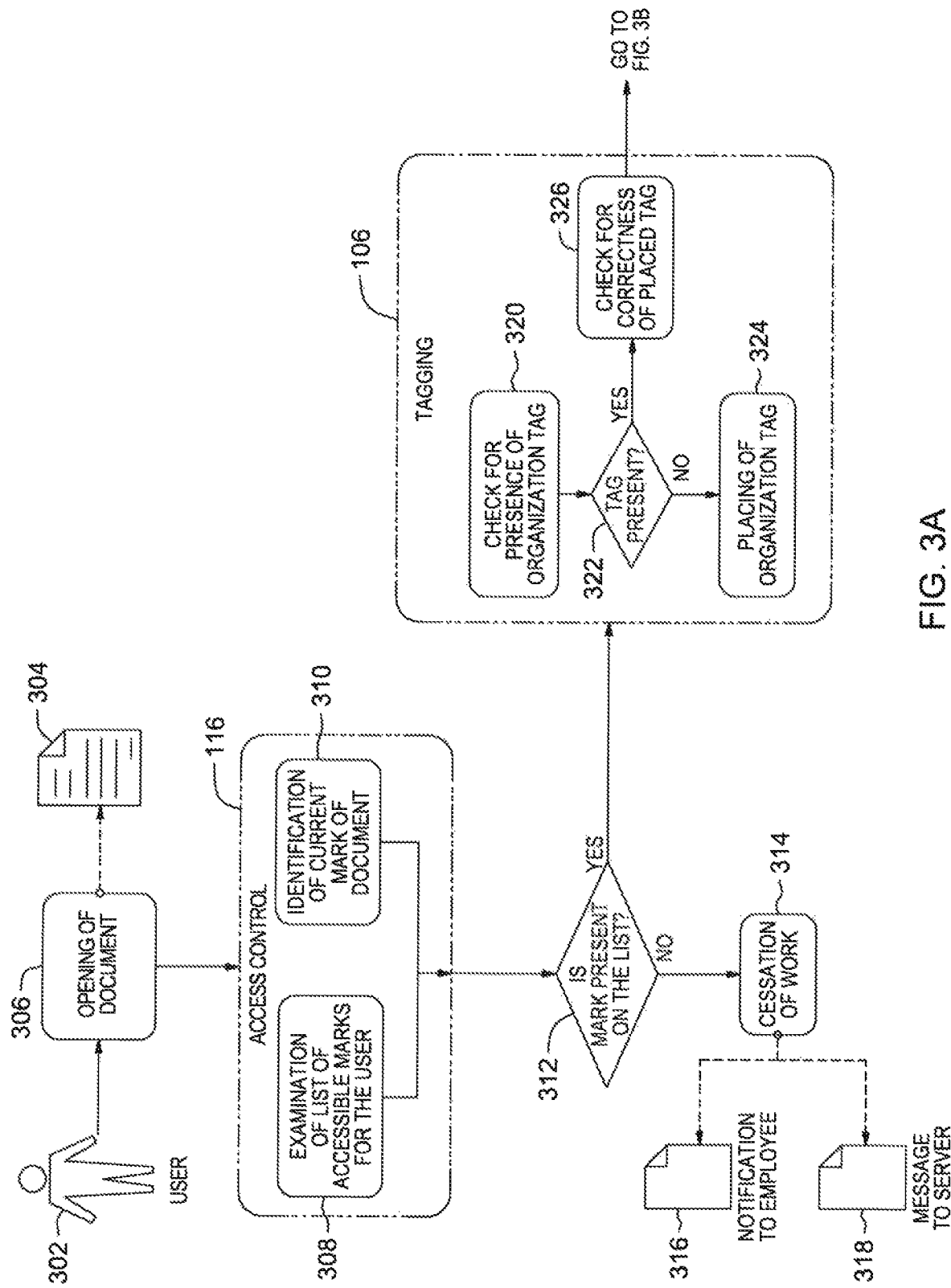
FIGS. 3A and 3B are a flowchart showing the procedure for opening a document within the context of the system.
Figure 3B:
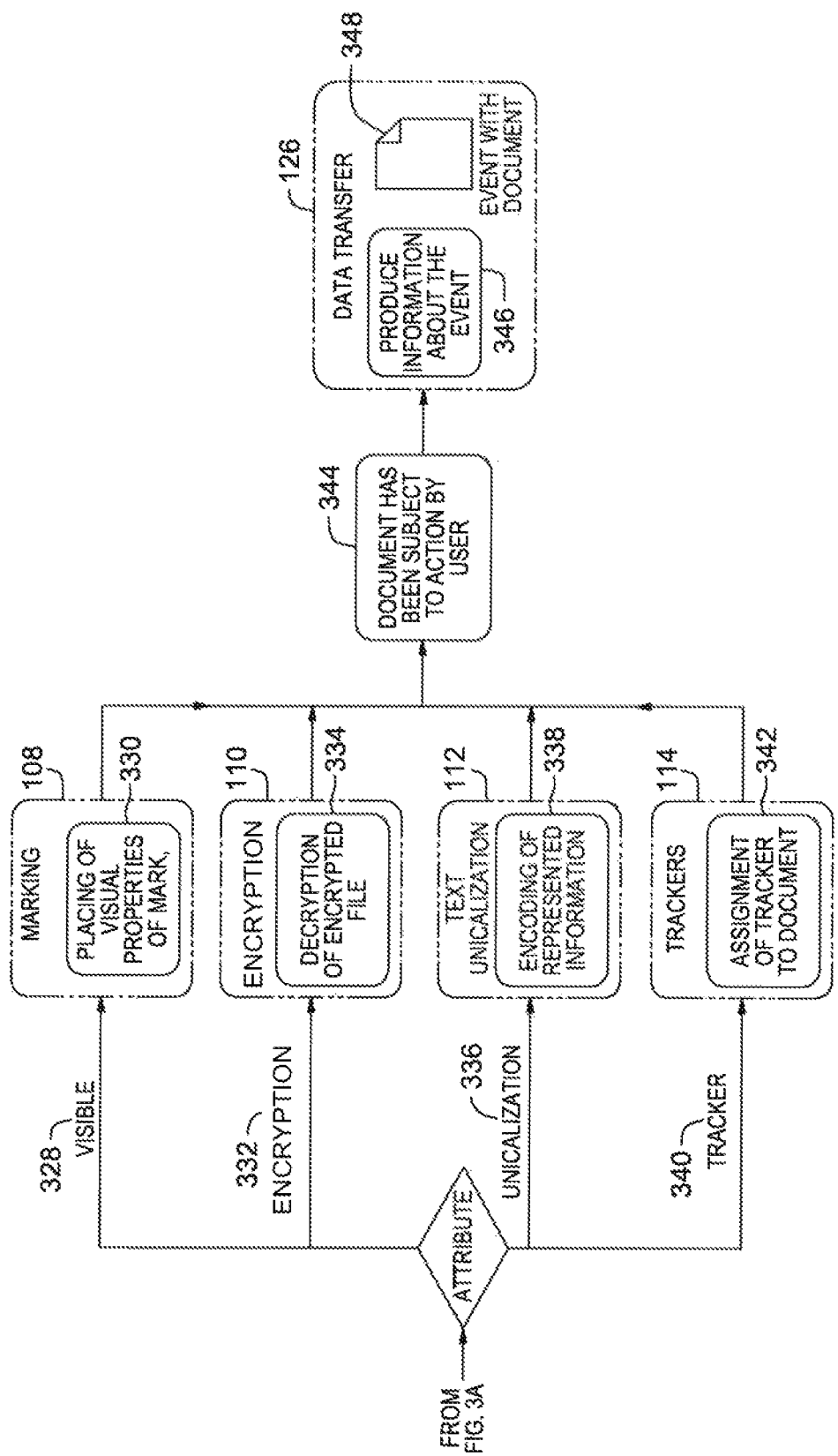

FIGS. 3A and 3B are a flowchart showing the procedure for opening a document within the context of the system, FIGS. 3A-3B illustrate user's work with the documents where a visible digital mark has been placed on the document, the file is locked in an encrypted container, text unicalization is used on the text, or a tracker is placed on the document. FIG. 3A describes an attempt by a user 302 to perform a file access operation 306 on the document 304. For this purpose, at 308, the access control module 116 may read the metadata of the document 304. These metadata may contain information on the current mark on the document 304. Alternatively, the access control module 116 may deduce information from the result of the reading that the document 304 has no confidentiality mark. At 310, the access control module 116 may compare the unique number of the digital mark on the document 304 with the accessible marks for the user 302. If the mark on the document 304 is not on the permitted list of marks for the user 302 (decision block 312, "No" branch), the document 304 will not be opened (314). In addition, at 316, the access control module 116 may output on the screen a message indicating the prohibition of access to the file, At 318, the access control module 116 may send information to the server component 104 about the attempt to open the document 304 with a mark prohibited for the user 302. If the mark on the document 304 is on the list of permitted marks for the user 302 (decision block 312, "Yes" branch), or if there is no mark on the document, then, at 320, the tagging module 106 may check for the presence of a tag of the organization on the document 304. If the organization tag is not present (decision block 322, "No" branch), then, at 324, the tagging module 106 may enter the correct tag of the organization into the metadata of the document 304. The parameters of the established mark are then placed in the text of the document 304. If the organization tag is present (decision block 322, "Yes" branch), then, at 326, the tagging module 106 may check for correctness of the placed tag and may check the parameters of the placed mark.

As shown in FIG. 3B, if the attribute of a visible part is indicated in the mark parameters (328), then, at 330, the marking module 108 may display digital mark's parameters on the document 304 in the corresponding position, in a specified form, and in specified document formats (e.g., document markup form).

If the attribute of encryption is indicated in the mark parameters 332, then, at 334, the encryption module 110 may automatically decrypt the document 304 for examination, using an external cryptographic provider, for example.

If the attribute of text unicalization is indicated in the mark parameters 336, then, at 338, the text unicalization module 112 may encode the text of the document 304 to be displayed on the screen.

If the attribute of trackers is indicated in the mark parameters 340, then, at 342, the tracker module 114 may perform a supplementary check for the presence of a tracker in the document properties. In addition, at 342, the tracker module 114 may perform a check on the device used and on the account within which the attempt to open the document 304 was made. For example, if the document 304 is opened at a workplace not indicated in the store or outside the known account, then the system 100 may send an event to the user 302 with information about the opening of the document 304 outside the system 100, wherein an aspect, the information transferred may be the most precise session information and device parameters possible.

After all the attributes of the mark established have been determined, the document 304 may be opened with the attributes placed. The information about the opening of the document 304 may be sent to the data transfer module 126 (at 344). In an aspect, at 346, the data transfer module 126 may transfer the data related to the document 304 to the data storage 128. If reports of notification of one or other type of event have been configured under a user, then the user 302 may receive a report about a new event through the mail service or by means of push notifications, for example (at 348).

Subsequent access to the document 304 by the user 302 depends on the configuration of the access rules. The following actions may be made available to the user 302: printing the document 304, editing the document 304 and saving amendments, saving the current version of the document 304, modifying the confidentiality mark, and the like. Each of these actions may be accompanied by a process of selecting a mark. If a mark has already been assigned to the document 304 and the functionality "Always select current mark" is activated in the server configurations, then the user 302 does not mark the document 304 during the actions listed above. Otherwise, the selection of a mark is an obligatory action for the user 302 before successful completion of the actions of printing, saving, or saving the document 304.

Figure 4A:
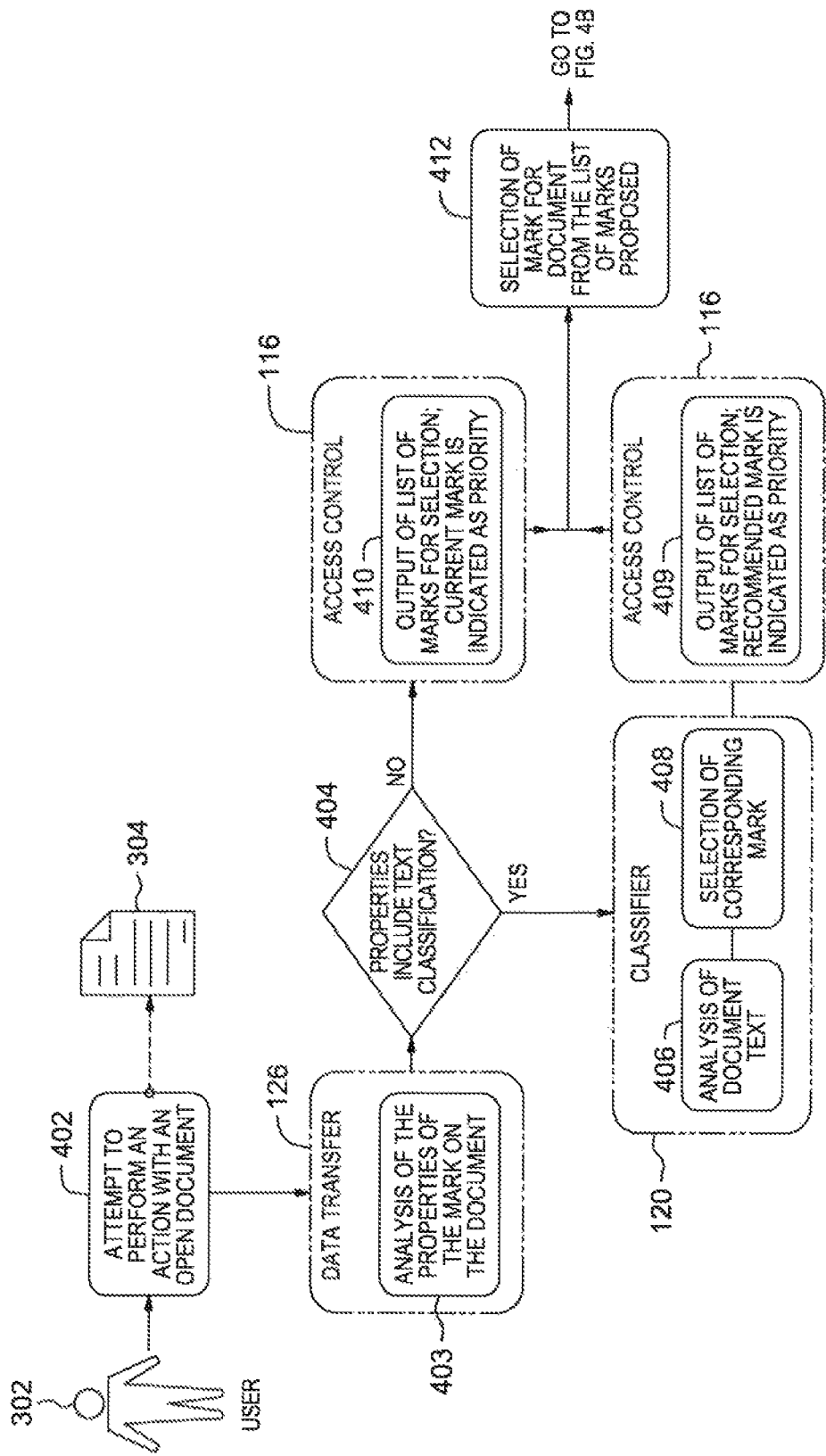
FIGS. 4A and 4B are a flowchart showing the procedure for digital marking of a document by a user.
Figure 4B:
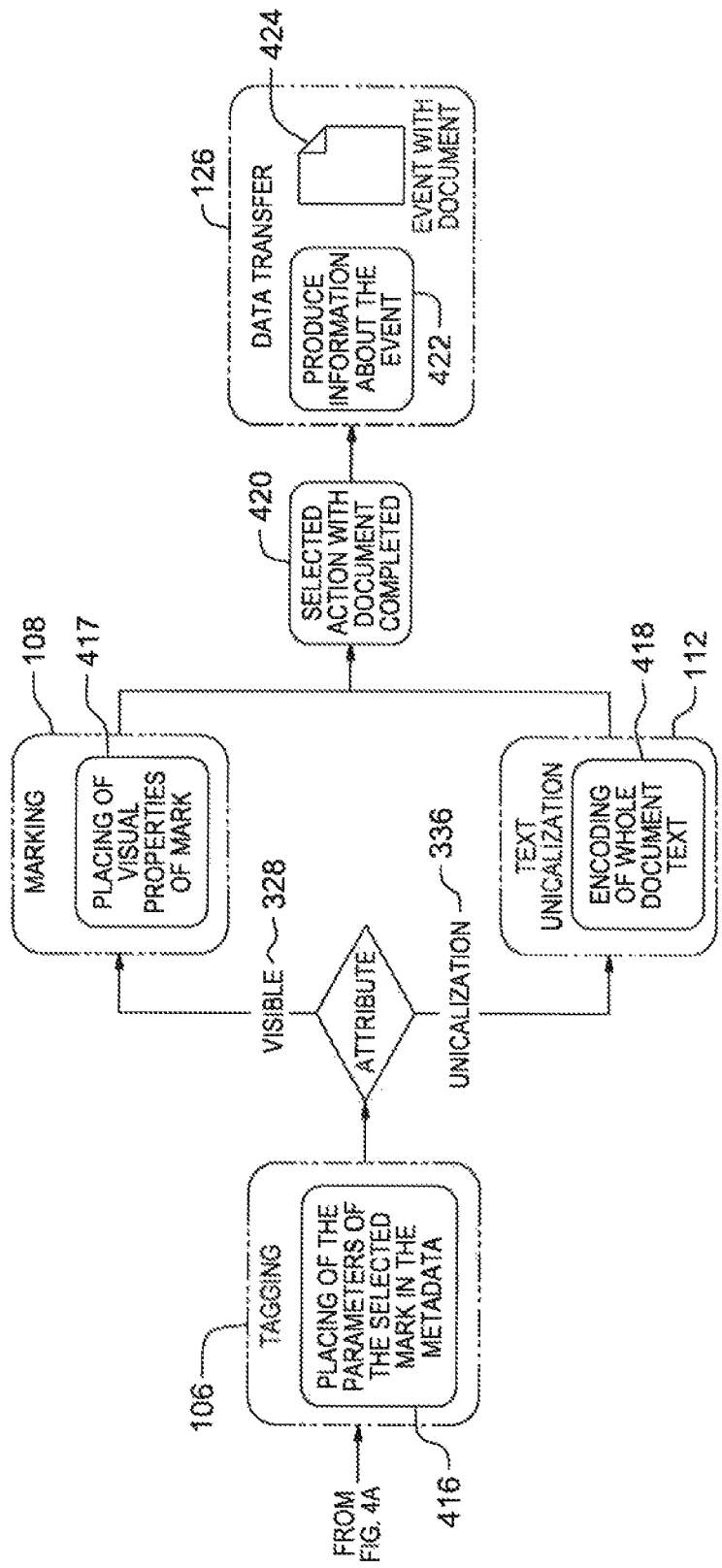

FIGS. 4A and 4B are a flowchart showing the procedure for digital marking of a document by a user. After successfully opening the document 304, the user 302 may continue to work with the document 304. At 402, the access control module 116 may determine if the user attempts to perform an action with the open document 304. When the user 302 performs one of the aforementioned actions, the data transfer module 126 may check the attributes of the placed mark (at 403). At 404, the data transfer module 126 may determine whether the attributes of the placed mark include the property of text classification. If a text classifier is configured on one or more of the digital marks accessible to the user 302 (decision block 404, "Yes" branch), the classifier 120 may analyze the path to the document 304 and may analyze the title and text of the document 304 according to the established parameters (at 406). At 408, based the results of the analysis performed at 406, the classifier 120 may determine the most suitable mark for the document 304 and may transfer the data to the access control module 116. In an aspect, the classifier 120 may determine the most suitable mark according to the content of specified combinations of words or data (data templates) in the document text. Alternatively, the classifier 120 may determine the mark by configuration of machine learning algorithms. The mark proposed by the classifier 120 may be presented to the user 302 as the recommended mark for selecting (at 409). If the text classifier is not configured on the accessible list of marks (decision block 404, "No" branch), or if none of the criteria configured in the text classifier is suitable for the document 304, the access control module 116 may propose the current mark for the document 304 as the recommended mark for selecting (at 410). The user 302 may select the recommended mark or any other marking from the drop-down menu of accessible marks. After user's selection of the mark (at 412), the tagging module 106 may place the actual electronic data for the selected mark. At 414, the tagging module 106 may check the parameters of the selected mark. If a mark with a visible representation was selected, the marking module 108 may place information on the document 304 (at 417). If a mark with text unicalization was selected, the text unicalization module 112 may encode the outputted text of the document 304 if printing takes place, and if the user 302 finishes his/her work with the document 304 the information about this functionality may be present in electronic form only (at 418). At 420, after the successful placing of all the mark parameters, the selected action is completed. The information about the event is produced in the data transfer subsystem and is sent to the server part. The information about the event may be sent to the data transfer module 126 (at 420). In an aspect, at 422, the data transfer module 126 may transfer the data related to the document 304 to the server component 104. If reports of notification of one or other type of event have been configured under a user, then the user 302 may receive a report about a new event through the mail service or by means of push notifications, for example (at 424).

Figure 5:
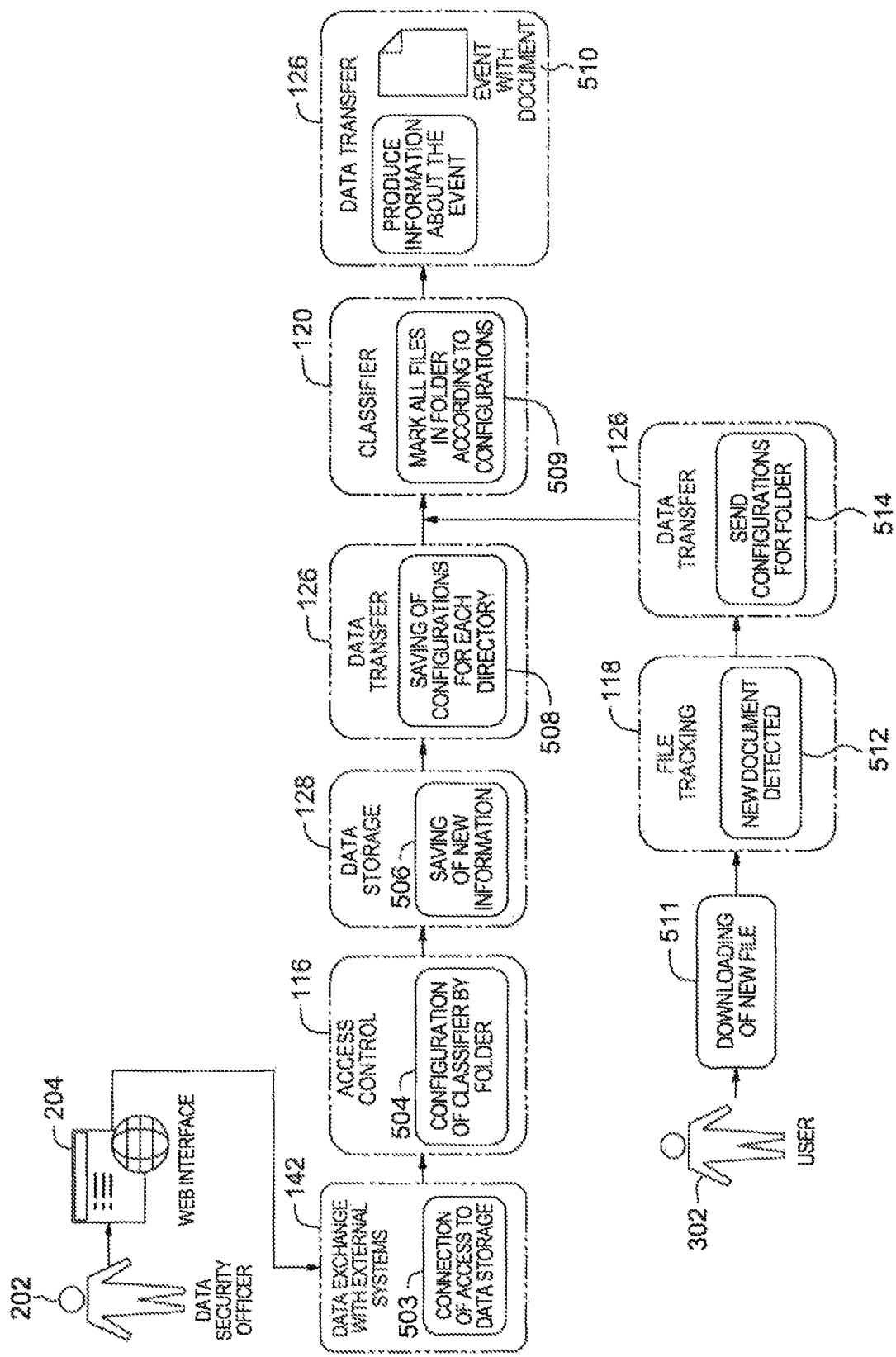
FIG. 5 shows a flowchart for the procedure of automatic document classification.

FIG. 5 shows a flowchart for the procedure of automatic document classification. A data security officer 502, using the web interface 204 and the module for exchanging data with external systems 142, can configure all the existing file stores in the organization (503). After the successful output of the store structure into the system 100, at 504, the user 302 may be able to use the access control module 116 to configure the automatic assignment of marks to an indicated directory or folder. The assignment of marks can be automated according to the classification configuration. To ensure that the preexisting documents in the folder concerned are all marked with an existing mark, the user 302 may activate the classifier functionality. The marking of the document 304 may change automatically when the document 304 is moved from one folder to another. At 506, all the configurations may be stored in the data storage module 128. At 508, the corresponding configurations for the user's automated workplace may be transferred to the client portion 102 by means of the data transfer module 126. In an aspect, the current configurations may be stored for each directory. At 509, when the contents of configurations for a folder are first received, the classifier 120 may analyze the contents of the folder and may mark the respective documents with the corresponding mark. The information about the marked documents may be transferred to the server component 104 at 510. If the user 302 outputs the document 304 from an external medium, for example, from a network, the file tracking module 118 may detect the document 304 (at 512) and may activate the checking of current configurations in the folder with the new file (at 514). The step 514 may be performed by the data transfer module 126. In response to receiving the current information, the classifier 120 may mark the document 304 in accordance with the folder configuration (at 509).

Figure 6:
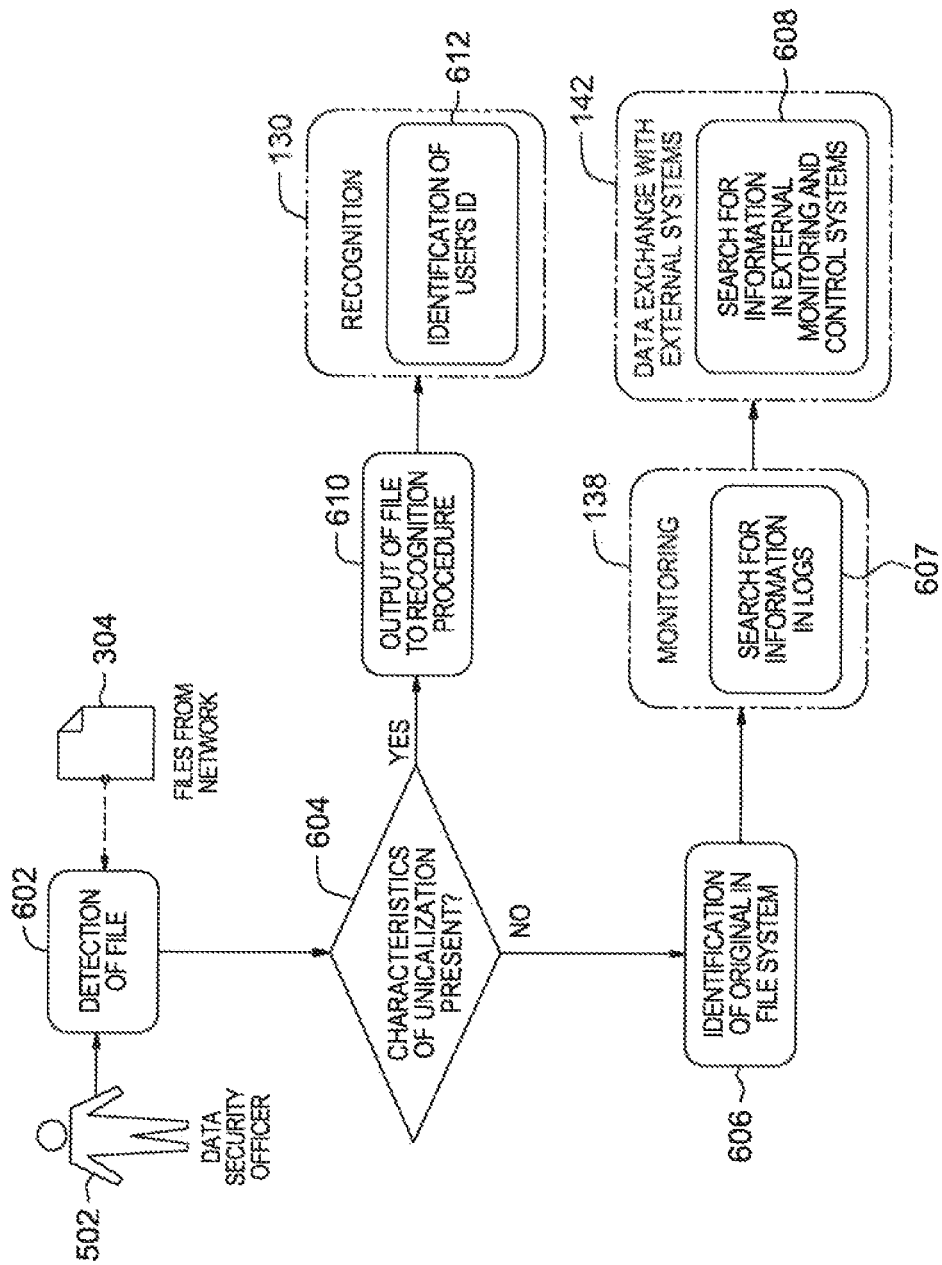
FIG. 6 shows a flowchart for the procedure of investigating incidents.

FIG. 6 shows a flowchart for the procedure of investigating incidents. At 602, information concerning the detection of a graphic image (photo or scanned copy) of the document 304 containing confidential information relating to the organization may be sent to the data security officer 502. The types of confidential/sensitive information can include, for example, financial information—credit card and bank account numbers, Personally Identifiable Information (PII)—Social Security Number (SSN), health/healthcare information, Intellectual Property—earnings forecasts, sales pipeline, trade secrets, source code, and the like. At 604, the administration module 132 may determine whether any recognizable elements of unicalization are present in the image of the document 304. In response to determining that characteristics of unicalization are absent from the received document (decision block 604, "No" branch), at 606, the administration module 132 may identify the document 304 and may determine the title and location of the original document 304, or any copy of it, in the data storage 128. The administration module 132 may infer the identity of the document 304 from the content of the document 304. In response to determining the document data, such as title, the monitoring module 138 may use the document log and document tree to identify the list of users 302 who have worked with said document (at 607). The log may contain information about the user's workstation, the user's account data, and the time and date of work with the document. In some cases, it would be very difficult to identify an individual suspect, because a large number of users may have worked with the given document 304. If necessary, at 608, the module for exchanging data with external systems 142 may obtain data from the external access control and management system 150 and the video monitoring system 152 appropriate for the search period. If there are not enough data for the most effective narrowing of the circle of suspects, the administration module 132 may search for digital evidence in relation to all identified suspects. In this manner an individual suspect, or a small group of suspects may be found.

However, if the subject of a data leak investigation is a file (not an image or a document), and the metadata of the file were not affected by external software, then information about the file may be retrieved from the metadata concerning the mark (the tag or mark of a parent document). In an aspect, the retrieved metadata may be compared with the data from the logs and may help identify a suspect user with the greatest possible accuracy.

In response to determining that characteristics of unicalization are present in the received document (decision block 604, "Yes" branch), at 610, the administration module 132 may send the document 304 to the recognition module 130. At 612, the recognition module 130 may carry out the investigation process rapidly and may provide unambiguous identification of the user 302 who disclosed the document 304.

Figure 7:
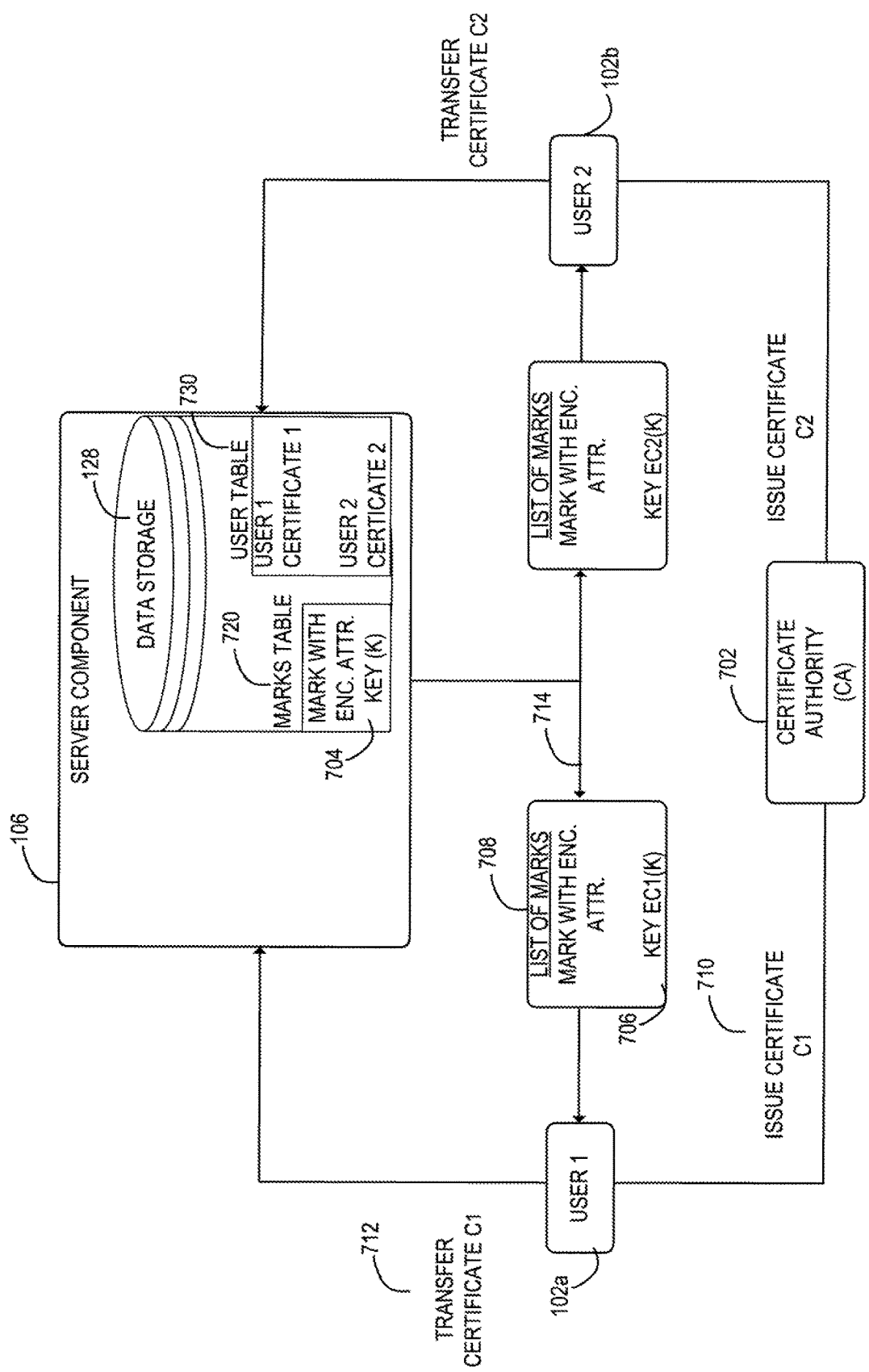
FIG. 7 shows a flowchart for the procedure of encryption/decryption of documents using digital certificates.

FIG. 7 shows a flowchart for the procedure of encryption/decryption of documents using digital certificates. More specifically, FIG. 7 shows the process of registration and acquisition of digital certificates from CA by the server component 104 and shows transfer of keys to client components associated with users 302, such as a first client component 102a associated with the first user and a second client component 102b associated with the second user. At 710, the CA 702 may issue a C1 certificate to the first client component 102a. At 712, the first client component 102a may transfer first user's C1 certificate to the server component 104.

At some later time, the first client component 102a may request from the server component 104 a list of marks. In response to such a request, the server component 104 may verify first user's certificate to ensure that C1 certificate is valid. If verification is successful, the server component 104 may generate a symmetric encryption key K 704. Next, the server component 104 may encrypt the generated symmetric key K 704 using first user's public key and may store it in a marks table 720. In an aspect, the server component 104 may add the resulting generated symmetric key Es1(K) 706 (in encrypted form) to the mark having encryption attribute. In an aspect, at 714, the server component 104 may transmit the generated symmetric key Es1(K) to the first client component 102a as one of the parameters of the corresponding mark included in the list of marks 708 available to the first user. In other words, transmitted mark parameters may include, but are not limited to, symmetric key Es1(K) 706 and the selected symmetric encryption algorithm (not shown in FIG. 7).

In an aspect, the tagging module 106 of the first client component 102*a* may perform tagging of a corresponding document with the digital mark having an encryption attribute in the mark's parameters, when a mark with the encryption attribute is selected from the list of marks 708 available to the first user. In an aspect, the encryption module 110 of the first client component 102*a* may encrypt the document when the document is closed. In an aspect, the encryption module 110 may automatically decrypt the document, if an attribute of encryption is indicated in the one or more electronic marks, based on the symmetric encryption key and the symmetric encryption algorithm included in the one or more electronic marks. The decryption of the document may occur upon opening of the document and successfully checking the presence of the mark having encryption attribute. Furthermore, upon opening of the document, the server component 104 may perform verification of first user's certificate to ensure that the C1 certificate is still valid based on the user table 730.

In an aspect, the encryption process using a key may be similar to the aforementioned encryption process using a digital certificate acquired from the CA 702. The keys may be stored in encrypted form on the server component 104 and may be transmitted centrally via secure communication channels to client components 102.

Figure 8:
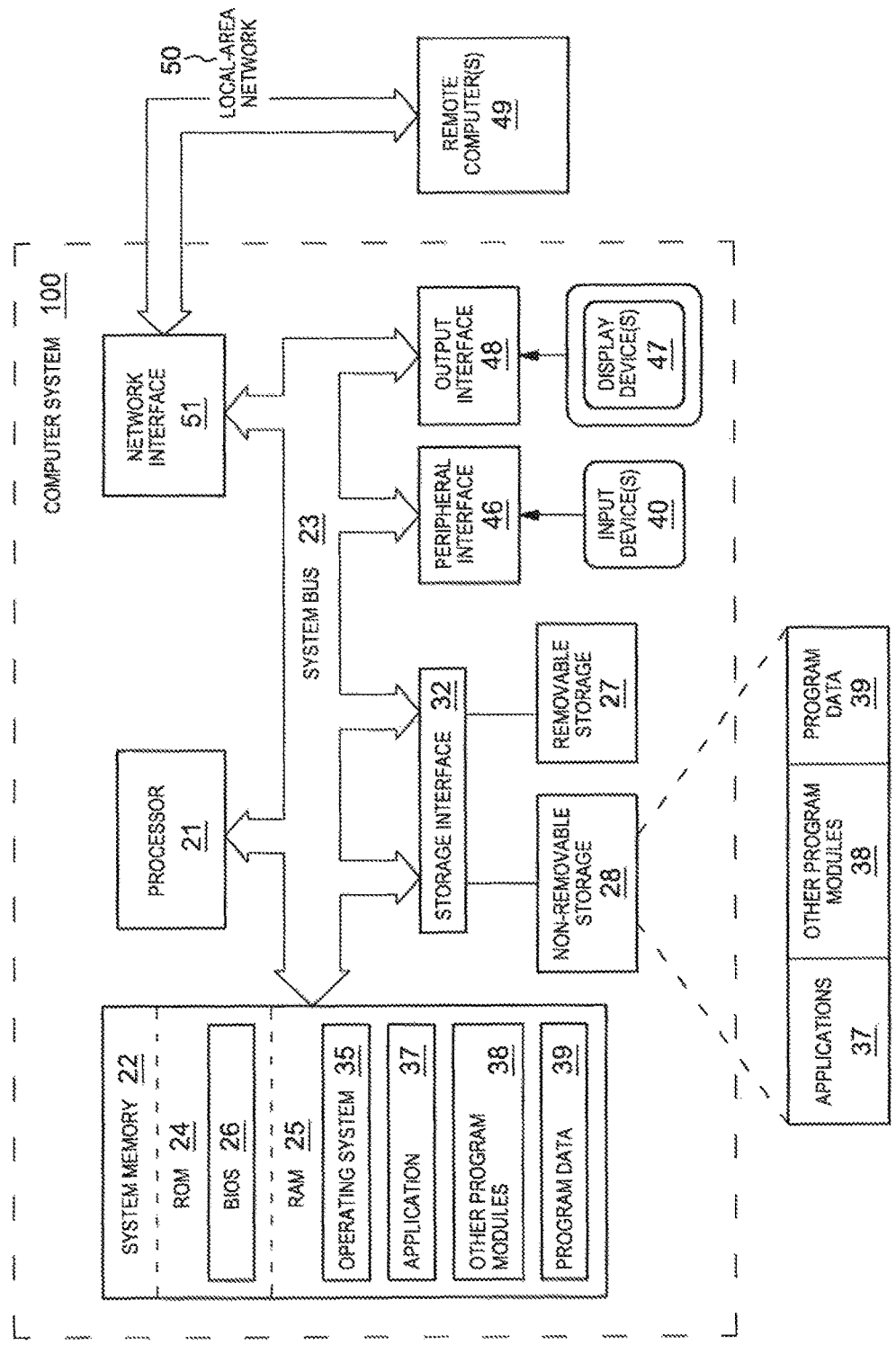
FIG. 8 shows an example of a general-purpose computer system.

FIG. 8 is a block diagram illustrating a computer system 100 on which aspects of systems and methods for controlling the access to confidential information may be implemented in accordance with an exemplary aspect. The computer system 100 may represent the computer system of FIG. 1 and can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 100 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 400, such as those at the time of loading the operating system with the use of the ROM 24.

The computer system 100 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 100. The system memory 22, removable storage devices 27, and non-removable storage devices 28 may use a variety of computer-readable storage media. Examples of computer-readable storage media include machine memory such as cache, static random access memory (SRAM), dynamic random access memory (DRAM), zero capacitor RAM, twin transistor RAM, enhanced dynamic random access memory (eDRAM), extended data output random access memory (EDO RAM), double data rate random access memory (DDR RAM), electrically erasable programmable read-only memory (EEPROM), NRAM, resistive random access memory (RRAM), silicon-oxide-nitride-silicon (SONOS) based memory, phase-change random access memory (PRAM); flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 400.

The system memory 22, removable storage devices 27, and non-removable storage devices 28 of the computer system 100 may be used to store an operating system 35, additional program applications 37, other program modules 38, and program data 39. The computer system 100 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 100 may be equipped with other peripheral output devices (not shown), such as loudspeakers and other audiovisual devices The computer system 100 may operate in a network environment, using a network connection to one or more remote computers 49. The remote computer (or computers) 49 may be local computer workstations or servers comprising most or all of the aforementioned elements in describing the nature of a computer system 100. Other devices may also be present in the computer network, such as, but not limited to, routers, network stations, peer devices or other network nodes. The computer system 100 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 400. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein. In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure. Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A computer-implemented method for protecting electronic documents containing confidential information, the method comprising:
assigning one or more electronic marks to a document, wherein the one or more electronic marks is assigned based on one or more access rules and includes a symmetric encryption key and a symmetric encryption algorithm, and wherein the one or more access rules indicates which electronic marks can be assigned to one or more groups of users and indicate one or more possible permitted actions with the document having the assigned electronic mark;
monitoring continuously and in real-time access activity with respect to the document;
in response to receiving a request from a user to access the document, checking validity of a digital certificate of the user, checking permissions to access the document by analyzing metadata of the document and by analyzing the one or more access rules, wherein the metadata includes the one or more electronic marks;
denying access to the document and sending a notification to a server indicating an attempted unauthorized access to the document, in response to determining that the one or more electronic marks are not included in the list of permitted electronic marks for the user requesting the access to the document or in response to determining that the digital certificate of the user is not valid;

analyzing attributes of the one or more electronic marks, in response to determining that the one or more electronic marks are included in the list of permitted electronic marks and in response to determining that the digital certificate of the user is valid; and automatically decrypting the document, if an attribute of encryption is indicated in the one or more electronic marks, based on the symmetric encryption key and the symmetric encryption algorithm included in the one or more electronic marks.

2. The method of claim 1, wherein the digital certificate includes a public key of the user, as issued by a Certificate Authority (CA).

3. The method of claim 1, further comprising receiving the symmetric encryption key from a server, prior to assigning one or more electronic marks to a document.

4. The method of claim 2, wherein the symmetric encryption key is encrypted using the public key of the user.

5. The method of claim 1, wherein the symmetric key encryption algorithm comprises AES-256 encryption algorithm.

6. The method of claim 1, further comprising automatically assigning a new electronic mark to the document when the document is moved from one folder to another.

7. The method of claim 1, wherein the one or more electronic marks are assigned using a classifier.

8. The method of claim 7, wherein the classifier determines a suitable mark to be assigned based on content of specified combinations of words or data in a text of the document.

9. A system for protecting electronic documents containing confidential information, the system comprising:
  a hardware processor configured to:
  assign one or more electronic marks to a document, wherein the one or more electronic marks is assigned based on one or more access rules and includes a symmetric encryption key and a symmetric encryption algorithm, and wherein the one or more access rules indicates which electronic marks can be assigned to one or more groups of users and indicate one or more possible permitted actions with the document having the assigned electronic mark;
  monitor continuously and in real-time access activity with respect to the document;
  in response to receiving a request from a user to access the document, check validity of a digital certificate of the user, check permissions to access the document by analyzing metadata of the document and by analyzing one or more access rules, wherein the metadata includes the one or more electronic marks;
  deny access to the document and send a notification to a server indicating an attempted unauthorized access to the document, in response to determining that the one or more electronic marks are not included in the list of permitted electronic marks for the user requesting the access to the document or in response to determining that the digital certificate of the user is not valid;
  analyze attributes of the one or more electronic marks, in response to determining that the one or more electronic marks are included in the list of permitted electronic marks and in response to determining that the digital certificate of the user is valid; and
  automatically decrypt the document, if an attribute of encryption is indicated in the one or more electronic marks, based on the symmetric encryption key and the symmetric encryption algorithm included in the one or more electronic marks.

10. The system of claim 9, wherein the digital certificate includes a public key of the user, as issued by a Certificate Authority (CA).

11. The system of claim 9, wherein the hardware processor is further configured to receive the symmetric encryption key from a server, prior to assigning one or more electronic marks to a document.

12. The system of claim 10, wherein the symmetric encryption key is encrypted using the public key of the user.

13. The system of claim 9, wherein the symmetric key encryption algorithm comprises AES-256 encryption algorithm.

14. The system of claim 9, wherein the hardware processor is further configured to automatically assign a new electronic mark to the document when the document is moved from one folder to another.

15. The system of claim 9, wherein the one or more electronic marks are assigned using a classifier.

16. The system of claim 15, wherein the classifier determines a mark to be assigned based on content of specified combinations of words or data in a text of the document.

17. A non-transitory computer readable medium comprising computer executable instructions for protecting electronic documents containing confidential information, including instructions for:
  assigning one or more electronic marks to a document, wherein the one or more electronic marks is assigned based on one or more access rules and includes a symmetric encryption key and a symmetric encryption algorithm, and wherein the one or more access rules indicates which electronic marks can be assigned to one or more groups of users and indicate one or more possible permitted actions with the document having the assigned electronic mark;
  monitoring continuously and in real-time access activity with respect to the document;
  in response to receiving a request from a user to access the document, checking validity of a digital certificate of the user, checking permissions to access the document by analyzing metadata of the document and by analyzing one or more access rules, wherein the metadata includes the one or more electronic marks;
  denying access to the document and sending a notification to a server indicating an attempted unauthorized access to the document, in response to determining that the one or more electronic marks are not included in the list of permitted electronic marks for the user requesting the access to the document or in response to determining that the digital certificate of the user is not valid;
  analyzing attributes of the one or more electronic marks, in response to determining that the one or more electronic marks are included in the list of permitted electronic marks and in response to determining that the digital certificate of the user is valid; and
  automatically decrypting the document, if an attribute of encryption is indicated in the one or more electronic marks, based on the symmetric encryption key and the symmetric encryption algorithm included in the one or more electronic marks.

18. The non-transitory computer-readable medium of claim 17, wherein the digital certificate includes a public key of the user, as issued by a Certificate Authority (CA).

19. The non-transitory computer-readable medium of claim 17, further comprising instructions for receiving the symmetric encryption key from a server, prior to assigning one or more electronic marks to a document.

20. The non-transitory computer-readable medium of claim 17, wherein the symmetric encryption key is encrypted using the public key of the user.

* * * * *